United States Patent [15] 3,674,832

Sherlock et al. [45] July 4, 1972

[54] CYCLOPROPANE CARBOXYLIC ACID DERIVATIVES

[72] Inventors: Margaret H. Sherlock, Bloomfield; Nathan Sperber, North Caldwell, both of N.J.

[73] Assignee: Schering Corporation, Bloomfield, N.J.

[22] Filed: Aug. 22, 1968

[21] Appl. No.: 754,743

[52] U.S. Cl. .......................260/469, 204/158 R, 204/162 R, 260/448 R, 260/465 E, 260/465 F, 260/465 G, 260/465 H, 260/465 R, 260/470, 260/471, 260/473 A, 260/473 R, 260/473 S, 260/473 SC, 260/501.11, 260/501.15, 260/515 A, 260/515 P, 260/515 R, 260/516, 260/518 R, 260/520, 260/544 M, 260/571, 260/574, 260/650 R, 260/651 F, 260/599, 260/651 R, 424/308, 260/600, 424/309, 260/609 E, 424/315, 424/316, 260/618 B, 424/317, 424/319, 260/649 D, 260/649 F, 260/649 R. 260/650 F

[51] Int. Cl. .....................................C07c 63/42, C07c 69/76
[58] Field of Search ..................260/515 A, 515 R, 516, 470, 260/469

[56] References Cited

UNITED STATES PATENTS 3,050,559   8/1962   Burger...................................260/515

*Primary Examiner*—James A. Patten
*Attorney*—Bruce M. Eisen, Stephen B. Coan and Raymond A. McDonald

[57] ABSTRACT

Disclosed herein are 2-(p-substituted phenyl)-cyclopropane carboxylic acids, which compounds are useful in alleviating inflammation and pain.

9 Claims, No Drawings

CYCLOPROPANE CARBOXYLIC ACID DERIVATIVES

This invention relates to compositions of matter which may be considered chemically as 2-(p-substituted phenyl)-cyclopropane carboxylic acids and to processes for making and using such compositions.

The invention sought to be patented in one of its composition aspects is described as residing in the concept of a chemical compound having the molecular structure of cyclopropane having a carboxy moiety attached to one of the ring carbon atoms and a phenyl nucleus attached to a different carbon atom of the cyclopropane ring; said phenyl nucleus itself being substituted in the para position with either a phenyl radical or a saturated lower aliphatic hydrocarbyl radical having at least one secondary carbon atom. The aforesaid phenyl nucleus can optionally be further substituted in the ortho or meta positions. Also included within this concept are the pharmaceutically acceptable salts and esters of the aforesaid cyclopropane carboxylic acids.

The invention sought to be patented in another of its composition aspects resides in the concept of a pharmaceutical formulation having anti-inflammatory and analgesic properties containing a novel composition of matter of this invention.

The invention sought to be patented in one of its process aspects is described as residing in those concepts which comprise the reaction sequence of reducing the appropriately para substituted acetophenone to form the corresponding carbinol, followed by dehydrating the latter to form the corresponding p-substituted styrene, and then reacting the latter with a diazoacetic acid ester (preferably a lower alkyl ester) to form the corresponding ester of the 2-(p-substituted phenyl)-cyclopropane carboxylic acid, followed by hydrolysis of the ester to the desired acid.

The invention sought to be patented in another of its process aspects is described as residing in the concept of treating and alleviating inflammation and inflammatory conditions by administering a therapeutically effective quantity of a novel composition of matter of this invention. Another process aspect of this invention is the use of novel compositions of this invention to cause an analgesic effect. Another process aspect of this invention is the use of the novel compositions of matter of this invention in combination with other active therapeutics to provide desirable complementary effects when employed in the treatment of inflammatory conditions and in the treatment of pain.

A more specific representation of the tangible embodiments of this invention are the chemical compositions having the structural formula:

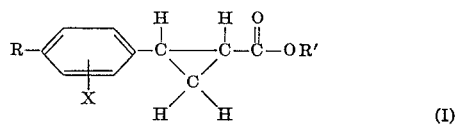

(I)

wherein R is a phenyl radical or a saturated lower aliphatic hydrocarbon radical having at least one secondary carbon atom; X is hydrogen, halogen, trifluoromethyl, nitro, lower alkyl, di-lower alkyl amino, lower alkylthio, lower alkoxy or hydroxy, and R' is hydrogen, an alkyl radical having one to 12 carbon atoms, or a pharmaceutically acceptable cation.

As used herein the term "lower aliphatic hydrocarbon radical having at least one secondary carbon atom" means cyclized or branched-chain lower alkyl radicals as illustrated by isopropyl, isobutyl, isoamyl, cyclopentyl, cyclohexyl, cycloheptyl, cyclohexylmethyl and the like. Preferably R is a cycloalkyl radical having five to seven carbon atoms and, most preferably, R is cyclohexyl. X is preferably in the meta position relative to the cyclopropyl moiety and, most preferably, X is meta-chloro.

The term "pharmaceutically acceptable cation" includes any cation which forms p-substituted cyclopropane carboxylic acid salts which do not create any difference in kind of pharmaceutical activity from that shown by the corresponding free acid. Such cations can be used to provide greater solubility or greater ease in formulation than the free acid. Representative of such salts are those wherein the cation is an alkali metal such as sodium or potassium, ammonium, substituted ammonium such as diethanolammonium or such metal cations as calcium or aluminum. Similarly, the pharmaceutically acceptable esters of the free cyclopropane carboxylic acids are those which are used in pharmaceutical formulations and which do not create any difference in kind of pharmaceutical activity from that shown by the free cyclopropane carboxylic acid. The esters themselves do not change the characteristic application of the free acid but merely facilitate application or formulating of the compounds, as for example, by increasing solubility. When hydrolyzed in the body, these esters yield the free cyclopropane carboxylic acid and a pharmaceutically acceptable alcohol, e.g. ethanol. The R' moiety may be further functionally substituted to increase polarity, solubility, and other such characteristics, such R' groups including dialkylaminoalkyl (e.g. dimethylaminoethyl) and glycerol esters. Such esters are considered to be the full equivalent of the free cyclopropane carboxylic acids.

It is to be noted that formula I embraces both cis- and trans-geometric isomers as well as optical isomers. It is to be understood that this invention embraces all such isomers, although it is recognized that variations in efficacy are to be expected. The cis- isomers, i.e. those wherein the carboxy moiety and the p-substituted phenyl moiety are on the same side of the plane of the cyclopropane ring, are preferred. Cis- and trans- isomers of the compounds of this invention can generally be separated by conventional fractional crystallization techniques or by preferential hydrolysis of the ester. Generally the trans ester hydrolyzes first and thus it can readily be separated from the cis- isomer. A desired d- or l-optical isomer can be isolated from the racemate in the conventional manner via salt formation with an optically active resolving base such as d-amphetamine. The techniques of salt formation and separation of the salts as by fractional crystallization are well known to those skilled in the art.

The compounds of formula I can be prepared by reducing an appropriately substituted acetophenone (II) with a suitable reducing agent such as sodium borohydride and then dehydrating the corresponding carbinol (III), as for example, by the use of phosphorous pentoxide or potassium bisulfate to form the corresponding p-substituted styrene (IV). A reagent such as ethyl diazoacetate can then be added to product IV to form the corresponding p-substituted cyclopropane carboxylic acid ethyl ester (V). The latter ester is then hydrolyzed to the free acid (I), as for example, using potassium hydroxide. This reaction scheme can be depicted as follows:

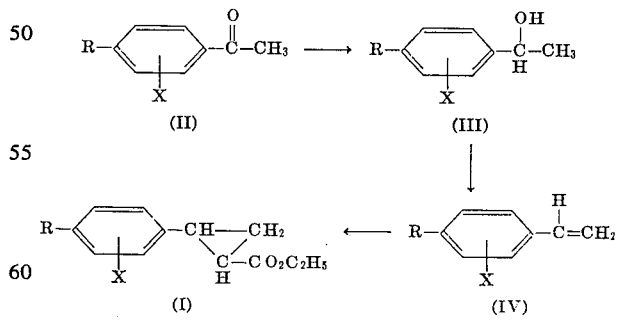

wherein R and X have the meanings described above.

The compounds of this invention may also be produced by other processes. For example, the p-substituted styrene (IV) can be oxidized, using for example potassium permanganate and sodium iodate, to the corresponding p-substituted benzaldehyde. The latter can be condensed with diethyl malonate in the presence of a catalytic amount of piperidine to yield the corresponding p-substituted benzal malonate. The latter can be added along with an equivalent of sodium hydride to a suspension of trimethyl-sulfoxonium iodide in dimethylsulfoxide. The product thereof, diethyl-2-(p-substituted phenyl)-cyclopropane-1,1-dicarboxylate, is then hydrolyzed with one equivalent of potassium hydroxide in ethanol to yield ethyl 2-(p-substituted phenyl)-1-carboxycyclopropane carboxylate.

The latter is decarboxylated by heating and hydrolyzed with strong base to give the desired 2-(p-substituted phenyl)-cyclopropane-1-carboxylic acid.

The compounds of this invention can also be produced by photolyzing the solution of the p-substituted styrene (IV) and bromomalononitrile in a suitable solvent such as methylene chloride. Cf. Boldt et al., Ber. 100, p. 1,282 (1967). The product, the corresponding 2-(p-substituted phenyl)-1,1-dicyanopropane, can then be hydrolyzed and then decarboxylated under the conventional conditions to yield the desired cyclopropane carboxylic acid.

In still another manner the compounds of this invention can be prepared by adding bromine to the corresponding p-substituted acetophenone (II) in ether in the presence of a catalytic amount of aluminum chloride. The resultant p-substituted phenacyl bromide is then condensed with the sodium salt of diethylmalonate to yield the diethyl-p-substituted phenacyl malonate. The latter is then reduced to the corresponding carbinol with sodium borohydride in methanol. This carbinol can then be reacted with thionyl chloride in benzene to yield the corresponding chloro malonic ester which can then be reacted with sodium hydride in tetrahydrofuran to effect closure of the cyclo-propane ring. The resultant p-substituted phenyl cyclopropane dicarboxylate can then be hydrolyzed and decarboxylated to the desired free acid in the manner indicated above.

The following example illustrates a representative method of preparing compounds of this invention:

EXAMPLE 1

Preparation of cis- and trans-2-(3-chloro-4-cyclohexylphenyl)-cyclopropane carboxylic acid A. 1-(3-Chloro-4-cyclohexylphenyl)-ethanol 17.2 g. of sodium borohydride are added in portions to a solution of 75.0 g. of 3-chloro-4-cyclohexylacetophenone in 675 ml. of methanol. The solution is refluxed for two and one half hours, concentrated to 175 ml., diluted with water and extracted with ether. The ethereal extract is dried over sodium sulfate and concentrated. The desired product is distilled therefrom at 151°–152° C and 0.35 mm. Hg.

B. 3-Chloro-4-cyclohexylstyrene 1.8 g. of freshly fused potassium bisulfate and 0.01 g. of t-butyl catechol are added to a 3-necked flask which is equipped with a dropping funnel and small fractionating column. 30 g. of 1-(3-chloro-4-cyclohexylphenyl)-ethanol, as above-produced, are added to this flask at a bath temperature of 230°–240° C. and a vacuum of 10 mm. The product is collected, dissolved in ether, and dried. The desired product is distilled therefrom at 115°–118° C and 0.35 mm. Hg. (cis +trans)

C. Ethyl-2-(3-chloro-4-cyclohexylphenyl)-cyclopropane carboxylate 20.5 g. of 3-chloro-4-cyclohexyl styrene are added dropwise with stirring to 58 ml. of dry xylene heated to 90° C. and containing 16 g. of ethyl diazoacetate. After the addition is complete, the solution is refluxed for 5 hours and concentrated. The desired compounds are distilled therefrom at 175°–187° C and 0.55 mm. Hg.

D. 2-(3-Chloro-4-cyclohexylphenyl)-cyclopropane carboxylic acid 20.8 g. of the crude cis and trans mixture of ethyl-2-(3-chloro-4-cyclohexylphenyl)-cyclopropane carboxylate are added to a solution of 140 ml. ethanol containing 4.7 g. of potassium hydroxide and 24 ml. of water. The solution is refluxed for 3 hours, concentrated, treated with water and acidified. The crude mixture of cis and trans free acids is purified by fractional crystallization yielding the pure trans, m.p. 171.5°–173.5° C (upon recrystallization from acetonitrile), and pure cis, m.p. 117°–119° C (upon recrystallization from hexane).

EXAMPLE 2

Preparation of cis- and trans- 2-(p-biphenyl)-cyclopropane carboxylic acid 15 g. of p-phenylstyrene was reacted with 14.4 g. of ethyl diazoacetate and worked up in the same manner as in steps C and D of Example 1. The crude hydrolysis reaction product of cis and trans free acids is purified by fractional crystallization yielding the pure trans, m.p. 186°–187° C (upon recrystallization from acetonitrile), and pure cis, m.p. 151°–153° C (upon recrystallization from isopropyl ether).

Similarly, by substituting the corresponding p-substituted phenyl acetophenone for 3-chloro-4-cyclohexylphenyl acetophenone, one can analogously prepare the corresponding 2-(p-substituted phenyl)-cyclopropane carboxylic acids, as for example:

cis-2-(p-cyclohexylphenyl)-cyclopropane carboxylic acid, trans-2-(3-chloro-4-cyclohexylphenyl)-cyclopropane carboxylic acid, cis-2-(3-chloro-4-cyclopentylphenyl)-cyclopropane carboxylic acid, cis-2-(3-chloro-4-cycloheptylphenyl)-cyclopropane carboxylic acid, cis-2-(3-trifluoromethyl-4-cyclohexylphenyl)-cyclopropane carboxylic acid, cis-2-(2-iodo-4-cyclohexylphenyl)-cyclopropane carboxylic acid, trans-2-(3-bromo-4-cyclohexylphenyl)-cyclopropane carboxylic acid, cis-2-(3-thiomethyl-4-cyclohexyl)-cyclopropane carboxylic acid, cis-2-(3-chloro-4-isobutylphenyl)-cyclopropane carboxylic acid, trans-2-(3-nitro-4-isobutylphenyl)-cyclopropane carboxylic acid, trans-2-(3-methoxy-4-biphenyl)-cyclopropane carboxylic acid, cis-2-(3-methyl-4-isopropylphenyl)-cyclopropane carboxylic acid, cis-2-(3-hydroxy-4-isoamylphenyl)-cyclopropane carboxylic acid, trans-2-(3-fluoro-4-cyclohexylmethylphenyl)-cyclopropane carboxylic acid, cis-2-(3-chloro-4-cyclopropylmethylphenyl)-cyclopropane carboxylic acid, and cis-2-(p-3-pentylphenyl)-cyclopropane carboxylic acid.

The relief of inflammation by the administration of an anti-inflammatory agent without any untoward side effects being induced by this anti-inflammatory agent has long been desired. Steroids having cortisone-like activity have previously been employed to relieve inflammation. The use of steroid therapy, however, suffers from the drawback of such side effects as electrolyte imbalance, water retention and the like. The novel compositions of this invention are rather specific in their action and are non-steroidal in character, resulting in the relative absence of the side effects attributable to steroid therapy. The prior art has taught the use of certain non-steroidal compounds in the treatment of inflammatory conditions, but these have also been found to exhibit deleterious side effects, typically ulceration of the gastrointestinal tract. The novel compounds of this invention markedly lessen this ulcerative effect and thus they tend to exhibit high functional use indices.

It is known that the potency of a drug in delaying the appearance of edema in a rat's paw is closely correlated with its potency as an anti-inflammatory agent. Based thereon, the Carrageenin Induced Inflammation (Carrageenin Paw) Test is recognized as a standard pharmacological test for determining anti-inflammatory activity. The 2-(p-substituted phenyl)-cyclopropane carboxylic acids described herein exhibit an activity as evidenced by this test equal to or greater than that of the commonly used nonsteroid anti-inflammatory agent, phenylbutazone. Compounds of this invention also tend to exhibit marked and potent analgesic effects. Thus, the p-substituted phenyl cyclopropane carboxylic acids described herein are useful in treating inflammation, especially that associated with rheumatoid and osteoporosis joint diseases, collagen diseases, bursitis, gouty arthritis, spondylitis and the like.

On the basis of standard tests such as the aforesaid Carrageenin Paw Test, it is concluded that the effective anti-inflammatory dosage of the active ingredients of the compositions of this invention is within the range of about 1 to 20 mg. per kg. of mammalian body weight. Similarly, from standard pharmacological observations such as the Mouse Antiwrithing Screen, it is concluded that the effective analgesic dosage is also within the range of about 1 to 20 mg. per kg. of mammalian body weight. These dosages can be administered once daily or can be divided and taken at given intervals during the day. In each specific instance, however, the attending diagnostician will determine the dosage, amount and frequency taking into account related health factors of the subject.

The compounds of this invention may be administered alone or combined with other medicaments. In any event, a suitable pharmaceutically acceptable carrier is generally employed. A carrier is selected according to the route of administration to be used as well as according to the physical properties of the compounds and standard pharmaceutical practice. In a preferred embodiment the compositions of this invention are administered orally, although parenteral and topical administration are also contemplated. The preparations containing the active ingredients of this invention may be in the form of tablets, capsules, syrups, elixirs, suspensions, ointments, creams and the like.

In the formulations of pharmaceutical preparations there can be employed such substances which do not react with the compounds, as for example, water, gelatin, lactose, starches, magnesium stearate, talc, vegetable oils, benzyl alcohols, gums, polyalkylene glycols, and petroleum jelly. The following examples show typical tablet, capsule and parenteral formulations incorporating the tangible embodiments of this invention. The formulations are illustrative merely and no limitation is intended.

EXAMPLE 3

Enteric Coated Tablet Formulations

| Formula | Mg./core |
| --- | --- |
| Cis-2-[3-chloro-4-cyclohexylphenyl]-cyclopropane carboxylic acid | 100.0 |
| Citric acid | 1.0 |
| Lactose, USP | 33.5 |
| Dicalcium phosphate | 70.0 |
| Pluronic F–68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A alcohol, 50 ml./1000 cores | |
| Corn starch | 30.0 |
| Dry: | |
| Sodium lauryl sulfate | 3.0 |
| Magnesium stearate | 3.0 |
| Tablet weight | 350.0 |

Procedure - The 2-[3-chloro-4-cyclohexylphenyl]-cyclopropane carboxylic acid is mixed with the citric acid, lactose, dicalcium phosphate, pluronic and sodium lauryl sulfate. The above mixture is screened through a No. 60 screen and damp granulated with an alcoholic solution consisting of polyvinylpyrrolidone, Carbowax 1,500 and 6,000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen, add sodium lauryl sulfate and magnesium sulfate, mix and compress into desired shape on a tablet machine.

Coating - The above cores are treated with a lacquer and dusted with talc to prevent moisture adsorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

EXAMPLE 4

Capsule Formulation

| Formula | Mg.capsule |
| --- | --- |
| Cis-2-[3-chloro-4-cyclohexylphenyl]-cyclopropane carboxylic acid | 100.00 |
| Citric acid | 1.00 |
| Pluronic, F–68 | 40.00 |
| Sodium lauryl sulfate | 20.00 |
| Lactose | 238.00 |
| Magnesium stearate | 1.00 |
| Total: | 400.00 |

Procedure: Mix together 2-[3-chloro-4-cyclohexylphenyl]-cyclo-propane carboxylic acid, citric acid, pluronic, sodium lauryl sulfate and lactose. Pass through a No. 80 screen. Add magnesium stearate, mix and encapsulate into the proper size 2 piece gelatin capsule.

EXAMPLE 5

Parenteral Suspension

| Formula | Mg. |
| --- | --- |
| Cis-2-[3-chloro-4-cyclohexylphenyl]-cyclopropane carboxylic acid mictoppt | 50.0 |
| Sodium citrate | 10.0 |
| Tween 80 | 1.0 |
| CMC 7 LP | 5.0 |
| Methylparaben, USP | 1.8 |
| Propylparaben, USP | 0.2 |
| Benzyl alcohol | 9.0 |
| Purified water ad q.s. 1 ml. | |

Sterile micro-precipitate 2-[3-chloro-4-cyclohexylphenyl]-cyclopropane carboxylic acid (alternatives micronized steam sterilized or micronized ethylene oxide sterilized) is dispersed in a 10X sterile filtered concentrate of Tween 80 and sodium citrate. When dispersed a 1.33X sterile filtered vehicle of the remaining components is added. When uniformly dispersed sufficient water for injection is added to final volume. The product is then stored under aseptic conditions until packaged into multiple dose vials.

Numerous variations of the above-described compositions and methods will be apparent to one skilled in the art within the spirit of the present invention.

What is claimed is:

1. A composition of matter of the formula:

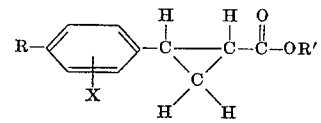

wherein R is a cycloalkyl radical having five to seven carbon atoms; X is hydrogen, halogen, trifluoromethyl, lower alkyl or thiomethyl; and R' is hydrogen, an alkyl radical having one to 12 carbon atoms or a pharmaceutically acceptable cation.

2. A composition according to claim 1 wherein R is cyclohexyl.

3. A composition according to claim 1 wherein R' is hydrogen.

4. A composition according to claim 1 wherein R' is ethyl.

5. A composition according to claim 1 wherein the X substituent is in a position meta to the cyclopropane carboxylic acid substituent.

6. A composition according to claim 5 wherein R is cyclohexyl.

7. A composition according to claim 1 wherein the carboxy moiety and the p-substituted phenyl moiety are cis- to each other.

8. A composition according to claim 1, said composition being cist2-(3-chloro-4-cyclohexylphenyl)-cyclopropane carboxylic acid.

9. A composition according to claim 5 wherein X is chloro.

* * * * *